(12) United States Patent
Kapoor et al.

(10) Patent No.: US 7,727,339 B2
(45) Date of Patent: Jun. 1, 2010

(54) SUBMERGED ARC FLUX

(75) Inventors: Ashish Kapoor, Highland Heights, OH (US); Teresa A. Melfi, Kirtland, OH (US)

(73) Assignee: Lincoln Global, Inc.

( * ) Notice: Subject to any disclaimer, the term of this patent is extended or adjusted under 35 U.S.C. 154(b) by 0 days.

(21) Appl. No.: 11/144,423

(22) Filed: Jun. 6, 2005

(65) Prior Publication Data
US 2006/0272746 A1 Dec. 7, 2006

(51) Int. Cl.
B23K 35/34 (2006.01)
B23K 35/24 (2006.01)

(52) U.S. Cl. .............. 148/26; 148/23; 148/24; 148/28

(58) Field of Classification Search .......... 148/23, 148/24, 26
See application file for complete search history.

(56) References Cited

U.S. PATENT DOCUMENTS

| | | | |
|---|---|---|---|
| 2,468,371 A | 4/1949 | Landis | |
| 2,868,949 A | 1/1959 | Todd | |
| 2,927,990 A | 3/1960 | Johnson | |
| 3,076,735 A | 2/1963 | Sharav | |
| 3,078,193 A | 2/1963 | Jackson | |
| 3,100,829 A | 8/1963 | Kubli | |
| 3,272,667 A | 9/1966 | Siegle | |
| 3,328,212 A | 6/1967 | Coless | |
| 3,424,626 A | 1/1969 | Coless | |
| 3,448,241 A | 6/1969 | Penson | |
| 3,571,553 A | 3/1971 | Godai | |
| 3,663,313 A * | 5/1972 | Oberly et al. ............. | 148/23 |
| 3,692,590 A | 9/1972 | Godai | |
| 3,868,491 A * | 2/1975 | Ito et al. ............. | 219/146.3 |
| 3,885,120 A | 5/1975 | Ropitzky | |
| 4,017,339 A * | 4/1977 | Okuda et al. ............. | 148/24 |
| 4,036,671 A | 7/1977 | DeHaeck | |
| 4,221,611 A * | 9/1980 | Nagano et al. ............. | 148/26 |
| 4,368,371 A * | 1/1983 | Dilthey et al. ............. | 219/73 |
| 4,436,562 A * | 3/1984 | Tokuhisa et al. ............. | 148/24 |
| 4,451,914 A | 5/1984 | LaBudde | |
| 4,566,916 A | 1/1986 | Nagano et al. | |
| 4,662,952 A * | 5/1987 | Barringer et al. ............. | 148/23 |

(Continued)

FOREIGN PATENT DOCUMENTS

CA 2 459 642 9/2004

(Continued)

OTHER PUBLICATIONS

Calcium Carbonate (http://en.wikipedia.org/wiki/Calcium_carbonate).*

(Continued)

*Primary Examiner*—Harry D. Wilkins, III
*Assistant Examiner*—Nicholas A. Smith
(74) *Attorney, Agent, or Firm*—Hahn Loeser & Parks, LLP; Keith J. Marcinowski

(57) ABSTRACT

A highly basic particle flux for submerged arc welding that produces less than 7 ml/100 gr of diffusible hydrogen in the weld metal, which flux comprises a carbon dioxide containing compound with an effective amount of heat releasable carbon dioxide in the range of 0.5-3.5% by weight of the flux over 10% by weight of a low melting point compound and a binder.

30 Claims, 2 Drawing Sheets

U.S. PATENT DOCUMENTS

| | | | | |
|---|---|---|---|---|
| 4,675,056 | A | * | 6/1987 | Melfi et al. .................... 148/24 |
| 4,683,011 | A | | 7/1987 | Weaver |
| 4,750,948 | A | * | 6/1988 | Consaul et al. ............... 148/24 |
| 4,764,224 | A | | 8/1988 | Okuda |
| 4,940,882 | A | * | 7/1990 | Bates ................... 219/146.22 |
| 4,950,331 | A | * | 8/1990 | Pokhodnya et al. ......... 106/313 |
| 5,120,931 | A | | 6/1992 | Kotecki |
| 5,300,754 | A | * | 4/1994 | Gonzalez et al. ......... 219/146.3 |
| 5,308,407 | A | | 5/1994 | Bishell |
| 5,308,698 | A | * | 5/1994 | Bishel et al. ................ 428/385 |
| 5,935,350 | A | | 8/1999 | Raghu |
| 6,331,688 | B1 | | 12/2001 | Hallen |
| 6,375,895 | B1 | | 4/2002 | Daemen |
| 6,939,413 | B2 | * | 9/2005 | Crockett ...................... 148/23 |
| 2004/0187961 | A1 | | 9/2004 | Crockett |
| 2005/0121110 | A1 | * | 6/2005 | Dallam et al. ................ 148/23 |
| 2006/0196919 | A1 | * | 9/2006 | James et al. ............... 228/223 |
| 2007/0017956 | A1 | * | 1/2007 | Karogal ..................... 228/101 |

FOREIGN PATENT DOCUMENTS

| | | |
|---|---|---|
| CA | 2 525 350 | 9/2006 |
| CN | 1 657 224 | 3/2005 |
| EP | 0 051 424 | 5/1982 |
| EP | 0626227 | 11/1994 |
| EP | 1468778 | 10/2004 |
| JP | 53095144 | 8/1978 |
| JP | 58-128295 | 7/1983 |
| JP | 61074797 | 4/1986 |
| JP | 2000-343277 | 12/2000 |
| JP | 2001-105179 | 4/2001 |
| JP | 2005-125345 | 5/2005 |

OTHER PUBLICATIONS manganese processing . (2008). In Encyclopædia Britannica. Retrieved Aug. 4, 2008, from Encyclopædia Britannica Online: http://www.search.eb.com/eb/article-9110665.*
http://web.archive.org/web/20000108155044/http://www.geology.neab.net/minerals/wollasto.htm, published Jan. 8, 2000.*
Lincoln Electric, "Material Safety Data Sheet," Aug. 15, 2001.
Lincoln Submerged Arc Product Catalog May 2003.

* cited by examiner

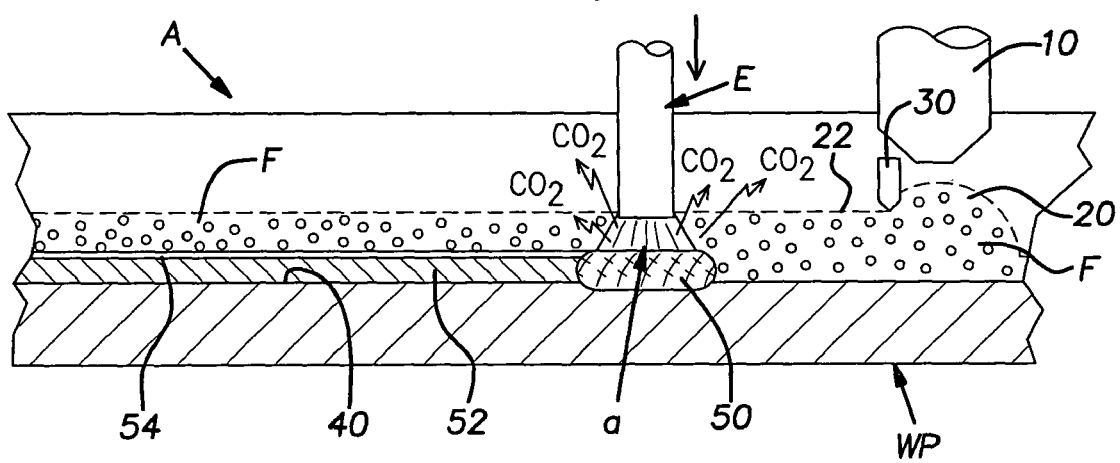
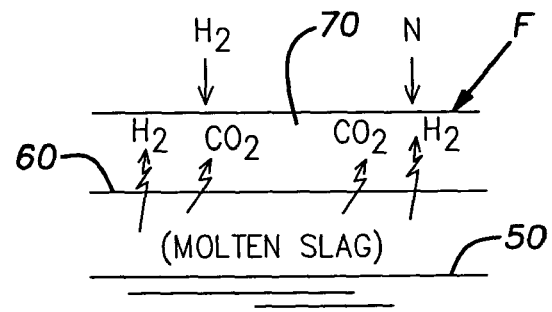
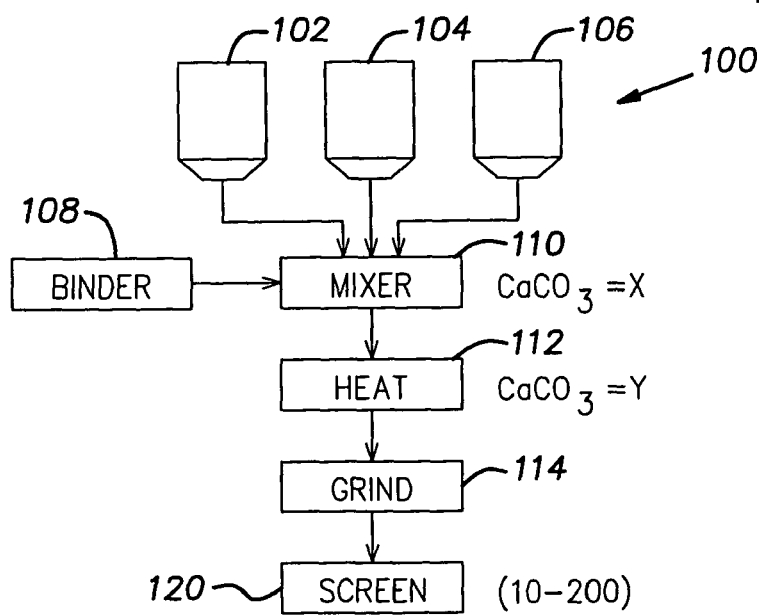

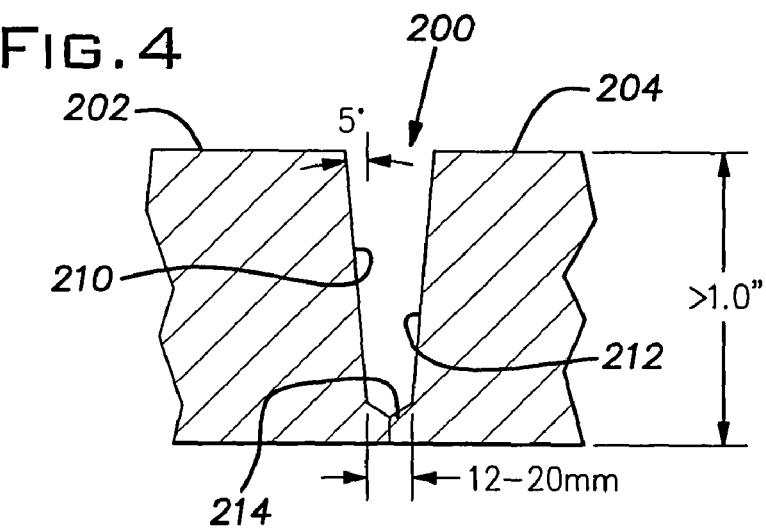
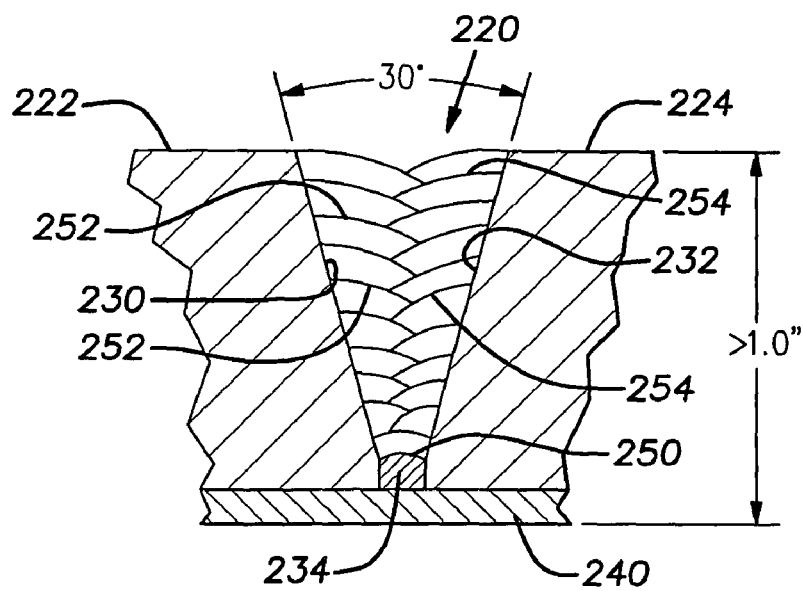
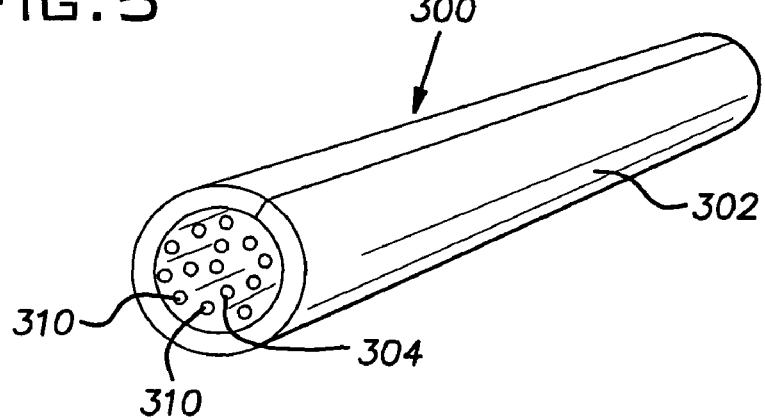

SUBMERGED ARC FLUX

The invention relates to the art of electric arc welding and more particularly to a granular flux for use in submerged arc welding of heavy workpiece sections.

BACKGROUND OF INVENTION

A highly basic granular flux for submerged arc welding is normally classified as H8 or H16 (as per AWS A4.3-93) when used with various AWS classes of electrodes. Consequently, the existing granular flux for submerged arc welding results in relatively high diffusible hydrogen in the weld metal. It is a well documented fact in the technical literature that a high diffusible hydrogen level makes the weld metal more prone to hydrogen assisted cold cracking (HACC). Achieving a low weld metal diffusible hydrogen level is now more critical due to the recent trend toward higher strength steels. Also, it is a known fact that a low nitrogen level in the weld metal enhances the weld mechanical properties, especially the weld metal toughness. Given the applications they are used in, having high toughness levels is critical for highly basic flux. Good slag removal is also important for highly basic fluxes, especially in narrow deep grooves of the type used in off shore welding, ship building, pressure vessel and wind tower constructions. In these structural fabrication environments, a narrow groove is provided in heavy metal workpieces with a thickness substantially greater than about 0.5 inches. With a narrow groove, as used on the European continent and relatively tight grooves, as used elsewhere, the first pass of a submerged arc welding process involves depositing a substantial amount of molten metal in a very deep, narrow groove. Thus, it is a disadvantage to have a flux that creates a slag that does not easily release from the molten metal bead and a bead with high diffusible hydrogen and inclusions of nitrogen. With all of these strict requirements for a deep groove weld bead, the flux is an essential element to be controlled in the combination of granular flux with any submerged arc welding electrode. The flux must be formulated and physically designed to produce low hydrogen, low nitrogen and acceptable slag removal. This type of flux must be capable of use with a wide variety of various electrodes without deteriorating the physical characteristic of the weld metal or the removability of the covering slag. All of these requirements of a submerged arc flux for use in deep narrow grooves have resulted in very high cost flux even though this costly flux is not necessary during the subsequent welding passes. Thus, there is a need for a low cost, granular flux to be used with a variety of electrodes in a deep groove submerged arc welding process which will result in quality weld metal as well as excellent slag removability in the toe crevices of the resulting bead. Such flux can therefore be used for deep groove submerged arc welding and is still economical for the filler passes of the groove.

There is provided a highly basic submerged arc flux having a basicity index B.I. greater than 2.0 and preferably about 2.6 per the Boniszewski formula:

$$B.I. = \frac{0.5(FeO + MnO) + CaO + MgO + Na_2O + K_2O + CaF_2}{SiO_2 + 0.5(TiO_2 + ZrO_2 + (Al)_2O_3)}$$

This highly basic submerged arc flux, in accordance with the present invention, generates less than 4 ml/100 g of diffusible hydrogen in the weld metal deposit. Thus, the highly basic submerged arc flux of the present invention is classified as an H4 flux (as per AWS A 4.3-93) with a diffusible hydrogen level less than 4.0. The flux is primarily used for the bottom weld of a deep groove. In the past, the basic submerged arc fluxes used economically in the deep groove environment had a basicity index of less than 2.0 calculated using the Boniszewski formula. The highly basic fluxes with a basicity index >2.0 that were used in the deep groove environment were either expensive or it was costly to remove the slag. By formulating the submerged arc granular flux as provided by the invention, a low cost highly basic flux is obtained with a classification of H4. This flux is compared to the prior highly basic fluxes having a classification of H8, or above. Thus, the present invention is the first highly basic H4 granulated flux for use in submerged arc that is not formulated by high priced ingredients or techniques making the flux economical in only the most restricted submerged arc welding operations. In the field, with multiple passes, the operator uses only one flux. In the past this need for a single flux was a costly necessity.

The present invention employs a low cost H4 classified granular flux which can be used successfully in the bottom of a narrow deep gap and that is also cost effective for use in subsequent submerged arc passes of a deep groove. There is no need for a special high cost submerged arc granular flux to be used in the deep bead while employing a less expensive granular flux in the upper weld passes filling a deep narrow groove. The present invention utilizes low cost constituents and is processed in accordance with standard technology to produce a weld metal that has low diffusible hydrogen and excellent slag removal even at the bottom of a narrow deep groove. The narrow deep groove used mainly in Europe, but also in other places for off shore welding and other high strength structural welding employs an extremely narrow groove to reduce the cost of the weld. This narrow groove requires a good slag removal, especially on the first pass. It is difficult to remove the slag from the bottom of a deep groove, when the groove is extremely narrow. A less restrictive, but still challenging narrow groove configuration has a wall angle of about 30°; however, this is still a type of deep groove submerged arc welding with the requirement of good slag removal and low diffusible hydrogen obtained by the present invention. The slag from these deep narrow grooves is often removed by a hand operation; therefore, resistance to removal must be slight, if any. Furthermore, the slag residue must not penetrate into the toe between the first pass and the sidewalls of the narrow, deep groove.

The present invention provides a weld in the lower area of a narrow, deep groove which weld is essentially clean with no residue. Since the cost of the granular flux of the present invention is generally commensurate with normal submerged arc flux, the novel flux can be used economically in all passes in the narrow groove. There is no technical or economical reason to use different fluxes for the various welding passes in the deep groove.

The novel flux is used for double ending pipe sections to produce quality welds preparatory to the joined sections being removed from the welding shop for pipeline construction in the field. The flux is used in off shore welding, structural fabrication, pressure vessels, ship building and wind towers. Its use results in low diffusible hydrogen levels in the weld metal, which hydrogen level is defined as being under 4 ml/100 grams of weld metal. This novel flux is designed to deliver easy deep groove slag removal and yields excellent weld metal toughness. The new flux provides hydrogen levels of less than H4 classification as per AWS A4.3-93. Tests indicate easier deep groove slag removal than other fluxes in this basicity. The basicity index for the preferred embodiment is 2.6 and the particle size is generally between 10 mesh and 60 mesh, indicating that the particle size is in the general range of 250-2,000 microns. This particle size produces a packing density or "apparent density" of the flux pile that optimizes the flux burden. The flux burden is well balanced between allowing gaseous removal and covering the molten metal weld bead prior to solidification. The recommended electrode for use in submerged arc welding with the new flux for mild steel under AWS A5.17-97 includes EM 13 K, EH 11K, EH 12K, EM 12K and EM 14K. When used in a submerged arc welding process requiring low alloy electrodes as per AWS A5.23-97, the new flux is used with electrodes ENi 1K, EF2, EF3, ENi 5, EA3K, EB2, EB3 and EM2 as well as other low alloy and mild steel electrodes and similar electrodes as classified under Euronorm and ISO standards. The use of the novel flux in combination with electrodes mentioned above is representative of different welding processes. In all instances, the diffusible hydrogen is less than 4 ml/100 grams. To accomplish the results attributed to the new low cost highly basic flux, the flux includes a special blend of specific ingredients together with common flux ingredients well known for producing a highly basic flux. By using the specific ingredients a H4 highly basic flux is provided with excellent slag removal characteristics.

In accordance with the present invention, there is provided a highly basic granular or particle flux. This flux is used for arc welding especially in the lower portion of a narrow, deep groove in a thick plate, such as a plate with a thickness of generally over about 0.5 inches. This flux produces less than 7 ml/100 grams of diffusible hydrogen in the weld metal. In accordance with the invention, this novel flux is classified as H4 and comprises a carbon dioxide containing compound with an effective amount of heat releasable carbon dioxide in the range of 0.5-3.5% by weight of the flux. The preferable range is 0.9-1.5% by weight. In this manner, the heat during the arc welding process releases a high volume of carbon dioxide for migration into a surrounding atmosphere. The carbon dioxide is also used for agitating the molten weld metal to assist in the removal of diffusible hydrogen and to obtain an excellent smooth appearance of the resulting bead. The flux also includes over 15% by weight of a low melting point compound and a liquid binder to form the cakes that are ground into the resulting granular flux. The low melting point compounds drastically improve slag removal after the welding operation and cooperates with the high release of carbon dioxide to produce a clean weld bead with an excellent appearance. In accordance with an aspect of the invention, the highly basic flux, as defined above, includes low melting point compounds which are in the form of a silicate or a fluoride. Indeed, the preferred low melting point compound is a silicate, such as sodium, potassium and manganese silicate or combinations of such silicates.

As can be seen, the invention involves a granular highly basic flux that releases a high volume of carbon dioxide and also includes, in combination, a relatively large volume of low melting point material that assist with the releasability of the resulting slag. The slag is agitated by the upwardly and outwardly moving carbon dioxide providing a protective atmosphere around the slag formation.

The flux, as defined above, can be modified to have a particular particle size so that at least 90% of the particles are in the range of a 10-100 mesh screen size. This grading of the particles provides an apparent density of the flux after it has been manufactured whereby the flux pile over the molten metal of the weld bead has a controlled balance between covering the bead and allowing upward movement of gas from the bead and from the flux forming the slag over the bead. To produce this apparent density, or packing density, of the deposited flux pile, the grading provides a broad particle size where over 70% of the particles are in the range of the 10-60 mesh screen size.

The primary object of the present invention is the provision of a low cost highly basic flux for submerged arc welding, which flux is classified as an H4 flux and comprises a carbon dioxide containing compound with an effective amount of heat releasable carbon dioxide to be released during the welding operation to form a carbon dioxide atmosphere around the weld metal and to agitate the molten weld metal and melted slag.

Still a further object of the present invention is the provision of a highly basic, low cost flux for submerged arc welding that produces a low amount of diffusible hydrogen and a slag which is easily removed, especially for deep, narrow groove welding operations.

Yet another object of the present invention is the provision of a flux for submerged arc welding, which flux produces a low diffusible hydrogen level and has excellent slag removal for deep groove welding operations. The resulting weld metal also has excellent weld metal toughness and low cold cracking characteristics.

Yet another object of the present invention is the provision of a flux, as defined above, which flux has an apparent density that covers the molten metal but allows movement of gas upwardly through the flux as it is being melted for forming slag.

Still a further object of the present invention is the provision of a flux, as defined above, which flux provides superior deep groove slag removal, can be used in multiple pass mild steel weldments requiring low temperature impact toughness and in multiple pass low alloy steel weldments requiring low temperature impact toughness. Furthermore, the resulting weld metal formed by submerged arc welding can be used in stress relieved applications.

These and other objects and advantages will become apparent from the following description taken together with the accompanying drawings.

DESCRIPTION OF DRAWINGS

FIG. 1 is a schematic cross-sectional view illustrating submerged arc welding process using a flux made in accordance with the present invention;

FIG. 2 is a partial schematic diagram illustrating certain characteristics obtained by the flux of the invention;

FIG. 3 is a schematic block diagram of the method for manufacturing the inventive flux;

FIG. 4 is a partial cross-sectional view of a deep, narrow groove in a heavy plate forming the use employing the primary advantage of the inventive flux;

FIG. 5 is a view, similar to FIG. 4, illustrating another deep, narrow groove to present the advantages of using the present invention and also illustrating various subsequent welding passes in a submerged arc welding process; and, FIG. 6 is a pictorial generally cross-sectioned view of another use of a flux having one characteristic of the present invention.

PREFERRED EMBODIMENT

In submerged arc welding, the electric arc from an electrode is buried in a granular flux through which the electrode is moved in a plowing action as schematically illustrated in FIG. 1. The invention is the provision of a novel flux F usable in a standard submerged arc welding process, specifically a process A for welding in a deep narrow groove. In process A, electrode E having any chemical composition required for the welding process creates an arc a between an advancing electrode E and workpiece WP. The electrode extends downwardly into granular flux F provided from a standard flux feeder 10. Initial flux pile 20 of granular flux F is leveled in area 22 by dam 30 moving with electrode E and feeder 10 in the direction indicated by the arrow in FIG. 1. Level flux area 22 is an operating pile of granular flux through which electrode E plows as it is melted by arc a to deposit in the bottom groove 40 a molten metal puddle 50. As electrode E moves to the right, molten metal puddle 50 hardens into metal bead 52 having an upper slag 54 created by flux F to form and protect the weld metal during solidification. The present invention relates to a novel composition for flux F, which flux has a capability of emitting a large amount of carbon dioxide. The $CO_2$ is released by melting flux F during the arc welding process and during the subsequent solidification of metal bead 52 and slag 54. In accordance with the invention, granular flux F is manufactured as a highly basic, neutral flux well suited for the demands of submerged arc heavy section welding for off shore, pressure vessel, wind tower construction and shipbuilding industries. The flux provides low diffusible hydrogen under 7 ml/100 grams in weld metal 52. This novel flux is designed to deliver easy deep groove slag removal and provides excellent yield strength and toughness for metal 52. The flux is manufactured and provides low diffusible hydrogen levels as set forth in AWS specification A4.3-93. By using the novel flux, the first deep groove welding pass of the submerged arc process provides easy removal of slag 54. The basicity index of the preferred embodiment is 2.6 and the particle size is generally between 10-100 mesh screen size using the U.S. standard. The particle size is generally 250-2000 microns. The graded size produces a packing density allowing a physical cover for weld bead 52 without preventing the egress of gas, such as $CO_2$ and hydrogen. The density is 1.2 g/ml. The flux is primarily applicable for narrow deep groove applications. It is inexpensive so it can be used economically for multiple passes of mild steel or low alloy steel to produce low temperature impact toughness. The resulting bead 52 is stress relieved when needed to alter the mechanical properties of the weld bead and/or the base plate. Various types of mild steel electrodes and low alloy electrodes, including those of AWS standards A5.17-97 and A5.23-97 can be used effectively as the electrode E in the process A illustrated in FIG. 1. The inventive flux F utilizes standard granular flux technology to provide a high basicity index greater than 2.0. This is standard technology in the submerged arc flux industry. The flux is modified to have the general formulation as set forth in Table I.

TABLE I (Flux)

| | Percentage by wt/flux |
|---|---|
| Silicate | 18-30% |
| Magnesium Oxide | 20-50% |
| Calcium Fluoride | 15-30% |
| Aluminum Oxide | 15-25% |
| Calcium Carbonate | 3-10% |
| Manganese Oxide | 1-5% |
| Other desired compounds | Remainder |

Basicity Index >2.0 Preferred 2.6 (Calculated using Boniszewski formula)
Screen size 10-100 mesh U.S. Standard One improvement of granular flux F is the use of a high amount of a carbonate bearing component such as calcium carbonate. This carbonate releases carbon dioxide when heated by arc a to melt flux F. The releasable carbon dioxide in flux F is in the general range of 0.5% to 3.5% and preferably in the general range of 0.9-1.5% by weight of the flux. This causes a high volume of releasable $CO_2$ forming a shielding gas having mechanical and physical characteristics generally outlined in FIG. 2 wherein flux F is melted to produce molten flux 60 over metal 50. When the flux is melted by the high temperature arc, carbon dioxide is released from the molten flux or slag to produce a protective carbon dioxide atmosphere envelope or layer 70. This protective layer prevents the ingress of hydrogen and nitrogen and forces diffusible hydrogen out of the molten metal puddle 50. The $CO_2$ atmosphere 70 in the granular flux and above the molten flux provides a shielding gas which blocks the ingress of atmospheric contaminants, as well as providing a stirring action for molten metal in metal 50. The stirring action releases diffusible hydrogen from the molten metal to decrease the diffusible hydrogen to a level less than about 4 ml/100 grams so the flux is classified as H4. Consequently, the high level of carbonate releases $CO_2$ shielding gas and agitates the molten metal of puddle 50 during the welding process. The carbonate is preferably provided by calcium carbonate; however, it can also be provided by magnesium carbonate, strontium carbonate or potassium carbonate or any other carbonate that decomposes in the welding arc in a manner similar to calcium carbonate. As a feature, the invention can use any solid that can transform into a gas at welding temperatures, but which will not harm weld metal properties. These are like release of $CO_2$ and is included in the invention, but is not now preferred.

As another aspect of the present invention, a high level of low melting point compounds are included in novel flux F. These compounds from Table I are the silicates, the manganese oxide and the calcium fluoride. In accordance with an aspect of the present invention, the low melting point compounds in flux F are greater than 10% by weight of the flux and are preferably in the range of 10-35% by weight of the flux. The low melting point compounds in the flux improve the slag removability and may be in the general range of 15-50% of the total constituent of the flux. The novel flux includes other desired components to complete the flux composition such as a standard binder or a combination of binders.

To provide the necessary average density or packing density of granular flux F, the flux is primarily in the screen size of 10-100 mesh. This allows the flux to pack around the molten metal to protect the molten metal from ingress of contaminants, while it is light enough to produce a pleasing appearance for the weld bead. The invention involves a graded grain size in the general range of 10-100 mesh; however, in accordance with another aspect of the invention, at least 70% of the particles in the flux are in the range of a 10-60 mesh screen size. The screen size is employed to further increase the removal characteristic of slag 54 and add to the bead appearance.

The novel flux used in combination with standard electrodes in process A produces physical characteristics and properties set forth in Table 2.

TABLE 2

(Weld Metal)

| | |
|---|---|
| Diffusible Hydrogen | <4.0 ml/100 g |
| Yield Strength | 40-125 ksi |
| Tensile Strength | 50-140 ksi |

TABLE 2-continued (Weld Metal)

| | |
|---|---|
| Elongation | 18-35% |
| Charpy V-Notch | 5-250 ft-lbs @ –40° C. |
| Slag Removal | Excellent |
| Bead Appearance | Excellent |

Manufacturing of the novel highly basic flux F is in accordance with a standard process 100 schematically illustrated in FIG. 3 wherein the various constituents are provided by several containers, such as the three hoppers 102, 104 and 106. The number of hoppers is determined by the number of ingredients used in the flux. These chemicals are bound with a binder, such as sodium silicate. In mixer 110 granular chemicals from the several containers and binder from supply 108 are mixed together. This forms a material that can be subsequently shaped and fired to produce granular flux. One of the constituents is a high amount of a carbonate bearing compound, such as calcium carbonate. The amount of calcium carbonate in the material of mixture 110 is represented by a first level X. The mixed material is directed to a heating device 112 which dries the constituents and forms agglomerations with the binder or binders. The carbonate may be reduced to a second level Y. This level may be less than level X if the heating operation has a high temperature near the decomposition temperature of the carbonate. The agglomerations from heating may be directed to a grinding device 114, which grinds the large particles which have been dried and hardened by the heating action.

Screening operation 120 grades the flux so that it has a particle size distribution in the general range of 10-100 mesh using the US Standard classification. The sizing operation yields an apparent density for the flux F. This apparent density is optimized by controlling the particle size distribution so that the flux burden over the molten metal is balanced between covering the metal and allowing gas escape through the flux. Apparent density is different than the actual density of the individual particles comprising flux F which density is referred to as the "true density" of the flux. In practice the true density is generally 1.2 g/ml. In accordance with an aspect of the invention, over 70% of the flux is in the size of 10-60 mesh. At least about 90% of the particles are in the range of 10-100 mesh. In one example, the particles have a distribution of 2% between 10-12 screen size, 50% between 12-20 screen size, 40% between 20-40 screen size, 5% between 40-60 screen size and 2% between 60-100 screen size. The other 1% is finer than the 100 screen size. By producing the flux set forth in Table I by the method shown in FIG. 3, a novel submerged arc granular flux is provided that produces low diffusible hydrogen and excellent slag removal in a deep narrow groove welding operation. Two of such operations are illustrated in FIGS. 4 and 5.

In FIG. 4, narrow deep groove 200 is formed between plates 202, 204. The spaced plates have a thickness greater than 1.0 inches. Side walls 210, 212 have an outer angle of about 5° with the bottom 214 with angles or a radius in the range of generally 6-10 mm but, sometimes 3-10 mm. This type of narrow deep groove is typically used in Europe, but is also used sometimes in the United States and other countries. Flux F is advantageous in the lower area at bottom 214; however, it is inexpensive and it can be used economically in subsequent passes to fill groove 200. Groove 222 shown in FIG. 5 is often used in the United States and includes plates 222, 224 with angled side walls 230, 232 having an included angle of generally 30° with a bottom deep narrow section 234.

In this illustration of deep groove welding operation, back plate 240 is employed to control the formation of bottom bead 250 in narrow section 234. Flux F is advantageously used in laying the bottom bead 250 to produce low diffusible hydrogen and at the same time a slag that has excellent removal characteristics from the deep groove. Thus, there is very little physical effort required in removing slag from the first pass in the welding operation for grooves 200 and 220. Flux F is improved by having a high carbon dioxide generating compound defined as a carbonate bearing compound which is used to lower the hydrogen and nitrogen levels in the weld metal. Low melting temperature components assist in the slag removal characteristics for the flux as does the optimum blending sizes defined above. Such grading of the particle size also assist in bead shape because of the apparent density of the flux. The flux can be used for submerged arc welding of subsequent bead 252, 254.

The novel flux of the present invention is primarily used for submerged arc welding as shown in FIG. 1 for the bottom bead and subsequent beads, such as beads 252, 254; however, the use of a high percentage carbonate bearing compound can also be used in electrode wire 300 having an outer sheath 302 with a center core 304 of granulated particulate material. Core 304 includes a flux system and alloy agents. The flux system is of the type that has at least 0.9% of a carbonate bearing compound so that the fluxing system releases carbon dioxide shielding gas during welding. This flux cored concept is a by-product of the present invention.

The invention has been described using any type of electrode used in submerged arc welding. The invention involves the combination of such electrode together with the granular flux as defined in Table I.

Having thus defined the invention, the following is claimed:

1. A flux adapted for submerged arc welding, said flux comprising a carbon dioxide containing compound and an effective amount of heat releasable carbon dioxide is in the range of 0.5-3.5% by weight of the flux and, over 15% by weight of low melting point compounds and a binder, said flux being a highly basic particle flux that produces less than 7 ml/100 grams of diffusible hydrogen in the weld metal, said flux having a basicity index of greater than 2, said carbon dioxide containing compound includes a carbonate, said low melting point compounds including silicate, manganese oxide, and fluoride said fluoride constituting between 15 and 30 weight percent of said flux, said manganese oxide constituting between 1 and 5 weight percent of said flux, and said silicate constituting between 18 and 30 weight percent of said flux.

2. The flux as defined in claim 1, wherein said carbonate is selected from the class consisting of calcium carbonate, magnesium carbonate, manganese carbonate, strontium carbonate, and mixtures thereof.

3. The flux as defined in claim 1, wherein said low melting point compound includes a silicate, said silicate includes sodium silicate.

4. The flux as defined in claim 1, wherein said low melting point compound is up to 50% by weight of said flux.

5. The flux as defined in claim 3, wherein said low melting point compound is up to 50% by weight of said flux.

6. The flux as defined in claim 2, wherein said low melting point compound is up to 50% by weight of said flux.

7. The flux as defined in claim 1, wherein said effective amount of heat releasable carbon dioxide is in the range of 0.9-1.5% by weight of the flux.

8. The flux as defined in claim 5, wherein said effective amount of heat releasable carbon dioxide is in the range of 0.9-1.5% by weight of the flux.

9. The flux as defined in claim 6, wherein said effective amount of heat releasable carbon dioxide is in the range of 0.9-1.5% by weight of the flux.

10. The flux as defined in claim 1, wherein particles of said particle flux have a size so at least about 90% of the particles are in the range of a 10-100mesh screen size.

11. The flux as defined in claim 9, wherein particles of said particle flux have a size so at least about 90% of the particles are in the range of a 10-100 mesh screen size.

12. The flux as defined in claim 10, wherein said at least 70% of the particles are in the range of a 10-60 mesh screen size.

13. The flux as defined in claim 11, wherein said at least 70% of the particles are in the range of a 10-60 mesh screen size.

14. The flux as defined in claim 1, including by weight percent:

| | |
|---|---|
| Silicate | 18-30% |
| Magnesium Oxide | 20-50% |
| Calcium Fluoride | 15-30% |
| Aluminum Oxide | 15-25% |
| Calcium Carbonate | 3-10% |
| Manganese Oxide | 1-5% |

15. The flux as defined in claim 8, including by weight percent:

| | |
|---|---|
| Silicate | 18-30% |
| Magnesium Oxide | 20-50% |
| Calcium Fluoride | 15-30% |
| Aluminum Oxide | 15-25% |
| Calcium Carbonate | 3-10% |
| Manganese Oxide | 1-5% |

16. The flux as defined in claim 11, including by weight percent:

| | |
|---|---|
| Silicate | 18-30% |
| Magnesium Oxide | 20-50% |
| Calcium Fluoride | 15-30% |
| Aluminum Oxide | 15-25% |
| Calcium Carbonate | 3-10% |
| Manganese Oxide | 1-5% |

17. A method of submerged arc welding of an elongated groove between workpieces with a thickness greater than about 0.25 inches, said method comprising:
  a) applying a flux at least one of said workpieces, said flux comprising a carbon dioxide containing compound and an effective amount of heat releasable carbon dioxide is in the range of 0.5-3.5% by weight of the flux and, over 15% by weight of low melting point compounds and a binder, said flux being a highly basic particle flux, said flux having a basicity index of greater than 2, said carbon dioxide containing compound includes a carbonate, said low melting point compounds including silicate, manganese oxide and fluoride, said fluoride constituting between 15 and 30 weight percent of said flux, said manganese oxide constituting between 1 and 5 weight percent of said flux, and said silicate constituting between 18 and 30;
  b) moving an electrode relative to said groove; and,
  c) creating an electric arc welding process between said electrode and said workpieces to form a weld metal having less than 7 ml/100 grams of diffusible hydrogen.

18. The method as defined in claim 17, wherein said weld metal having less than 4 ml/100 grams of diffusible hydrogen.

19. The method as defined in claim 17, wherein said thickness is at least about 0.5 inches.

20. The method as defined in claim 17, wherein said carbonate is selected from the class consisting of calcium carbonate, magnesium carbonate, manganese carbonate, strontium carbonate, and mixtures thereof.

21. The method as defined in claim 17, wherein said low melting point compound includes a silicate, said silicate includes sodium silicate.

22. The method as defined in claim 17, wherein said low melting point compound is up to 50% by weight of said flux.

23. The method as defined in claim 17, wherein said effective amount of heat releasable carbon dioxide is in the range of 0.9-1.5% by weight of the flux.

24. The method as defined in claim 17, including the step of controlling a particle size of said flux, at least about 90% of the particle size of said flux in the range of a 10-100 mesh screen size.

25. The method as defined in claim 24, wherein said at least 70% of said particle size of said flux in the range of a 10-60 mesh screen size.

26. The method as defined in claim 17, wherein said flux having a density of about 1.2 g/ml when applied to said at least one workpiece.

27. The method as defined in claim 17, wherein said flux includes by weight percent:

| | |
|---|---|
| Silicate | 18-30% |
| Magnesium Oxide | 20-50% |
| Calcium Fluoride | 15-30% |
| Aluminum Oxide | 15-25% |
| Calcium Carbonate | 3-10% |
| Manganese Oxide | 1-5%. |

28. The flux as defined in claim 1, wherein said low melting point compound includes manganese oxide, said manganese oxide constitutes greater than 1 weight percent of said flux.

29. The flux as defined in claim 16, wherein said manganese oxide constitutes greater than 1 weight percent of said flux.

30. The method as defined in claim 17, wherein said manganese oxide constitutes greater than 1 weight percent of said flux.

* * * * *